United States Patent
Lee

(10) Patent No.: US 12,379,029 B2
(45) Date of Patent: Aug. 5, 2025

(54) VARIABLE BACK-UP RING AND A SEALING STRUCTURE HAVING THE SAME

(71) Applicants: HYUNDAI MOTOR COMPANY, Seoul (KR); KIA CORPORATION, Seoul (KR)

(72) Inventor: Byung Ryeol Lee, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/391,069

(22) Filed: Dec. 20, 2023

(65) Prior Publication Data

US 2024/0117881 A1 Apr. 11, 2024

Related U.S. Application Data

(62) Division of application No. 17/500,693, filed on Oct. 13, 2021, now abandoned.

(30) Foreign Application Priority Data

Dec. 1, 2020 (KR) ......................... 10-2020-0165648

(51) Int. Cl.
*F16J 15/16* (2006.01)
*H01M 8/0276* (2016.01)

(52) U.S. Cl.
CPC ......... *F16J 15/166* (2013.01); *H01M 8/0278* (2013.01)

(58) Field of Classification Search
CPC .................................................... F16J 15/166
See application file for complete search history.

(56) References Cited

U.S. PATENT DOCUMENTS

| 511,734 | A | * | 12/1893 | Hoffstadt | ................. | F16J 15/20 |
| | | | | | | 277/537 |
| 2,705,177 | A | * | 3/1955 | Waring | .................... | F16J 15/32 |
| | | | | | | 277/584 |
| 2,922,668 | A | * | 1/1960 | Haake | ...................... | F16J 15/38 |
| | | | | | | 277/394 |
| 2,967,727 | A | | 1/1961 | Percy | | |
| 3,964,754 | A | | 6/1976 | Murai et al. | | |
| 4,597,581 | A | | 7/1986 | Nimberger | | |
| 4,716,005 | A | | 12/1987 | Ezekoye et al. | | |
| 5,240,263 | A | | 8/1993 | Nicholson | | |
| 6,648,337 | B1 | * | 11/2003 | Baehl | .................. | F16J 15/3216 |
| | | | | | | 277/584 |

(Continued)

FOREIGN PATENT DOCUMENTS

EP 0133787 A1 3/1985
GB 927629 A 5/1963

(Continued)

*Primary Examiner* — Vishal A Patel
(74) *Attorney, Agent, or Firm* — Lempia Summerfield Katz LLC

(57) ABSTRACT

A sealing structure includes a first connector body having a groove, a second connector body encompassing the first connector body, an O-ring partially received in the groove of the first connector body, and a variable back-up ring partially received in the groove of the first connector body and holding the O-ring. The variable back-up ring is deformable in a radial direction depending on a magnitude of a fluid pressure applied between the first connector body and the second connector body.

4 Claims, 7 Drawing Sheets

(56) References Cited

U.S. PATENT DOCUMENTS

| | | | |
|---|---|---|---|
| 8,590,867 B2 | 11/2013 | Leon | |
| 8,936,249 B2 | 1/2015 | Swensen et al. | |
| 9,752,682 B2* | 9/2017 | Winkelmann | F16J 15/166 |
| 10,316,614 B2 | 6/2019 | Fripp et al. | |
| 11,530,748 B2* | 12/2022 | Nobori | F16J 15/104 |
| 2004/0017047 A1* | 1/2004 | Taylor | F16J 15/164 |
| | | | 277/434 |
| 2008/0061510 A1 | 3/2008 | Li et al. | |
| 2013/0300070 A1 | 11/2013 | Ohmi et al. | |
| 2014/0070494 A1 | 3/2014 | Winkelmann et al. | |
| 2016/0273299 A1 | 9/2016 | Fripp et al. | |
| 2017/0363234 A1 | 12/2017 | Britt, Jr. | |
| 2018/0372223 A1* | 12/2018 | Yoshitsune | F16J 15/3268 |
| 2019/0107166 A1 | 4/2019 | Whitford et al. | |
| 2019/0316681 A1* | 10/2019 | Sawai | F17C 1/00 |

FOREIGN PATENT DOCUMENTS

| | | |
|---|---|---|
| GB | 1289964 A | 9/1972 |
| JP | 2008051285 A | 3/2008 |

* cited by examiner

VARIABLE BACK-UP RING AND A SEALING STRUCTURE HAVING THE SAME

CROSS-REFERENCE TO RELATED APPLICATION

This application is a divisional of U.S. Application Ser. No. 17/500,693 filed on Oct. 13, 2021, which claims the benefit of priority to Korean Patent Application No. 10-2020-0165648, filed on Dec. 1, 2020, in the Korean Intellectual Property Office, the disclosures of which are incorporated herein in their entirety by reference.

TECHNICAL FIELD

The present disclosure relates to a variable back-up ring, and more particularly, to a variable back-up ring that is deformable in a radial direction depending on a fluid pressure, i.e., the amount (magnitude) of force acting on an O-ring and/or a back-up ring, and relates to a sealing structure having the same.

BACKGROUND

A fuel cell is an electrochemical cell that converts the chemical energy of a fuel (hydrogen) and an oxidizing agent (oxygen) into electrical energy through redox reactions.

As the perception of environmental crisis and depletion of oil resources has increased, research and development of eco-friendly vehicles such as electric vehicles (EVs) and fuel cell electric vehicles (FCEVs) have actively been conducted.

A fuel cell system is made up of: a fuel cell stack generating electrical energy; a fuel supply system supplying a fuel (hydrogen) to the fuel cell stack; an air supply system supplying oxygen of the air as an oxidizing agent required for electrochemical reaction to the fuel cell stack; and a thermal management system (TMS) removing heat of reaction from the fuel cell stack out of the system and controlling the operating temperature of the fuel cell stack. The fuel cell system generates electricity through the electrochemical reaction between the fuel (hydrogen) and oxygen in the air and removes heat and water as reaction by-products.

The hydrogen supply system is configured to supply hydrogen, which is a relatively high-pressure fluid, to the fuel cell stack. In the hydrogen supply system, a sealing structure including an O-ring and a back-up ring for holding the O-ring may be provided between two connector bodies (e.g., a valve housing and a valve fitting) that match each other, thereby preventing leakage of the high-pressure fluid. The O-ring may create a seal between the two connector bodies, and the back-up ring may minimize a clearance gap between the two connector bodies to prevent the O-ring from entering the clearance gap between the two connector bodies.

When high-pressure hydrogen of 700 bar flows in such a high-pressure fluid system (the hydrogen supply system), a permeation leakage may occur as small-sized hydrogen molecules penetrate into a rubber (polymer) material of the O-ring, A leakage may also occur as cracks are generated in the O-ring due to pressurization/decompression. Specifically, as the hydrogen molecules penetrate into the rubber (polymer) material of the O-ring in the high-pressure hydrogen environment, O-ring swelling may occur. Accordingly, as the O-ring gets caught within the clearance gap, external cracks (extrusion) of the O-ring may occur. In addition, when the volume of hydrogen expands as hydrogen evaporates due to rapid decompression after the swelling of the O-ring, internal cracks (blister) of the O-ring may occur.

The clearance gap between the two connector bodies may be created due to manufacturing tolerances, assembly tolerances, and the like. In order to prevent damage to the sealing structure in the high-pressure fluid system, the back-up ring may minimize the clearance gap between the two connector bodies to thereby prevent damage to the O-ring.

However, as the back-up ring is mainly made of a rigid material such as a synthetic resin material, it is difficult for the back-up ring to minimize the clearance gap between the two connector bodies.

The above information described in this background section is provided to assist in understanding the background of the inventive concept. The background section may include any technical concept which is not considered as the prior art that is already known to those having ordinary skill in the art.

SUMMARY

The present disclosure has been made to solve the above-mentioned problems occurring in the prior art while advantages achieved by the prior art are maintained intact.

An aspect of the present disclosure provides a variable back-up ring having a shape that is variable or deformable in a radial direction and provides a sealing structure having the same.

According to an aspect of the present disclosure, a variable back-up ring may include: a first half shell; a second half shell having a symmetrical shape to the first half shell; and an inner cavity defined by the first half shell and the second half shell. The first half shell and the second half shell may be deformable depending on a magnitude of a fluid pressure acting on the first half shell and the second half shell.

The first half shell and the second half shell may have a reference shape when the fluid pressure is lower than a reference pressure. and The first half shell and the second half shell may have an expanded shape when the fluid pressure is higher than a reference pressure.

The shape of the first half shell and the second half shell may vary between the reference shape and the expanded shape as the magnitude of the fluid pressure varies. The reference shape may be a shape in which the first half shell and the second half shell contract radially inward. The expanded shape may be a shape in which the first half shell and the second half shell expand radially outward.

According to another aspect of the present disclosure, a sealing structure may include: a first connector body having a groove; a second connector body encompassing the first connector body; an O-ring partially received in the groove of the first connector body; and a variable back-up ring partially received in the groove of the first connector body, holding the O-ring. The variable back-up ring may be deformable in a radial direction depending on a magnitude of a fluid pressure applied between the first connector body and the second connector body.

The variable back-up ring may include an inner circumferential surface contacting the groove of the first connector body and an outer circumferential surface facing an inner circumference of the second connector body. A position of the outer circumferential surface of the variable back-up ring may be variable or deformable in the radial direction of the variable back-up ring depending on the magnitude of the fluid pressure.

The shape of the variable back-up ring may be variable or deformable so that the outer circumferential surface of the variable back-up ring may be brought into contact with the inner circumference of the second connector body when the magnitude of the fluid pressure is higher than a reference pressure.

The groove of the first connector body may include a base surface recessed radially inward from an outer circumference of the first connector body, a first side relatively close to a source of the fluid pressure, and a second side opposing the first side. The O-ring may be relatively close to the first side, and the variable back-up ring may be relatively close to the second side.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
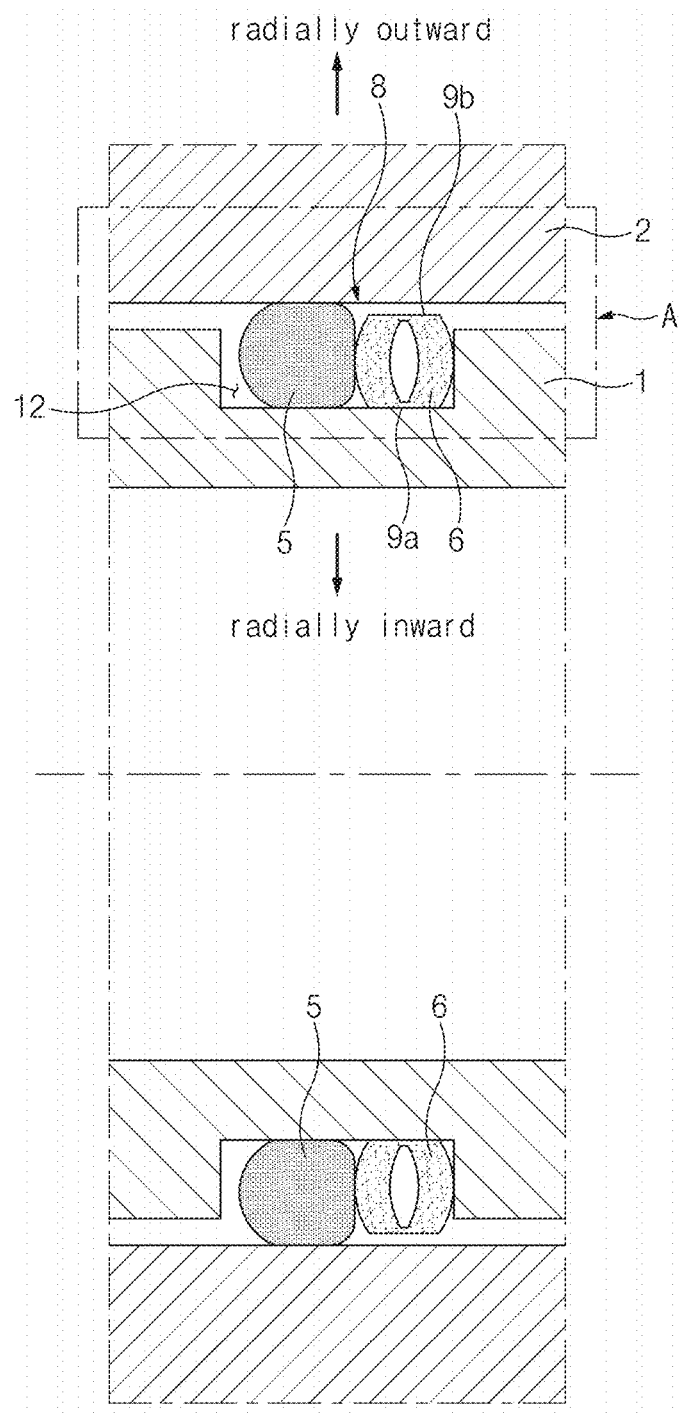
FIG. 1 illustrates a cross-sectional view of a sealing structure according to an embodiment of the present disclosure.

Hereinafter, embodiments of the present disclosure are described in detail with reference to the accompanying drawings. In the drawings, the same reference numerals are used throughout to designate the same or equivalent elements. In addition, a detailed description of well-known techniques associated with the present disclosure has been omitted in order not to unnecessarily obscure the gist of the present disclosure.

Terms such as first, second, A, B, (a), and (b) may be used to describe the elements in the embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those having ordinary skill in the field of art to which the present disclosure belongs. Such terms as those defined in a generally used dictionary are to be interpreted as having meanings consistent with the contextual meanings in the relevant field of art. Such terms are not to be interpreted as having ideal or excessively formal meanings unless clearly defined as having such in the present application.

The present disclosure relates to a sealing structure for preventing leakage of a high-pressure fluid from a high-pressure fluid system such as a hydrogen supply system of a fuel cell and relates to a back-up ring holding an O-ring in the sealing structure. In particular, according to embodiments of the present disclosure, an outer diameter of the back-up ring may be variable or deformable in a radial direction depending on the magnitude of a force or fluid pressure acting on the O-ring and the back-up ring.

Figure 2:
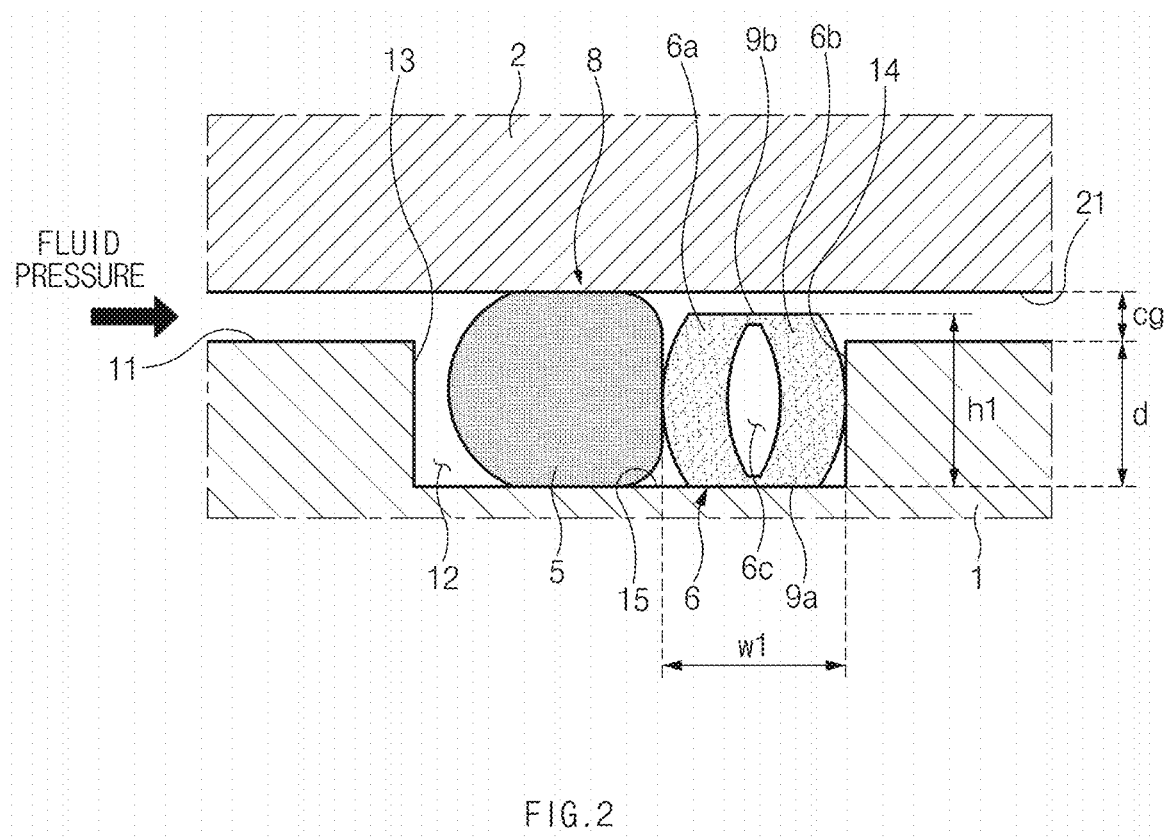
FIG. 2 illustrates an enlarged view of portion A of FIG. 1, a state of the sealing structure before a back-up ring is contracted under a low fluid pressure condition.

Referring to FIGS. 1 and 2, a sealing structure 8 according to an embodiment of the present disclosure may include a first connector body 1, a second connector body 2 encompassing the first connector body 1, an O-ring 5 received in a groove 12 of the first connector body 1, and a back-up ring 6 holding the O-ring 5.

The first connector body 1 may have an outer circumference 11. The annular groove 12 may be defined in the outer circumference 11 and the first connector body 1 may have a cylindrical shape. The groove 12 may have a base surface 15 recessed radially inward from the outer circumference 11 of the first connector body 1, a first side 13 relatively close to a source of a fluid pressure, and a second side 14 opposing the first side 13. The base surface 15 may be located between the first side 13 and the second side 14. The groove 12 may have a predetermined depth d. The depth d of the groove 12 may be a distance between the base surface 15 and the outer circumference 11.

The second connector body 2 may have an inner circumference 21 tightly encompassing the outer circumference 11 of the first connector body 1 and the second connector body 2 may have a cylindrical shape. The outer circumference 11 of the first connector body 1 and the inner circumference 21 of the second connector body 2 may face each other. the inner circumference 21 of the second connector body 2 may be spaced apart from the outer circumference 11 of the first connector body 1 by a clearance gap cg. In other words, the clearance gap cg may be defined between the outer circumference 11 of the first connector body 1 and the inner circumference 21 of the second connector body 2.

For example, the first connector body 1 may be a valve fitting of a high-pressure hydrogen valve having a cylindrical shape. The second connector body 2 may be a valve body of the high-pressure hydrogen valve having an opening into which the valve fitting is tightly fitted.

Alternatively, the first connector body 1 and the second connector body 2 may be part of a pressure regulator, a shut-off valve, a check valve, a flow valve, or a pipe fitting.

The O-ring 5 may be an annular seal at least partially received in the groove 12 of the first connector body 1. The O-ring 5 may be relatively close to the first side 13 of the groove 12. The O-ring 5 may be made of at least one material or a mixture of two or more materials among various materials such as acrylonitrile butadiene rubber (NBR), hydrogenated acrylonitrile butadiene rubber (HNBR), fluorocarbon (FPM, FKM, Viton™), ethylene propylene diene monomer (EPDM), neoprene chloroprene (CR), silicone (VMQ, PVMQ), acrylate (ACM) and polyurethane (AU).

Figure 3:
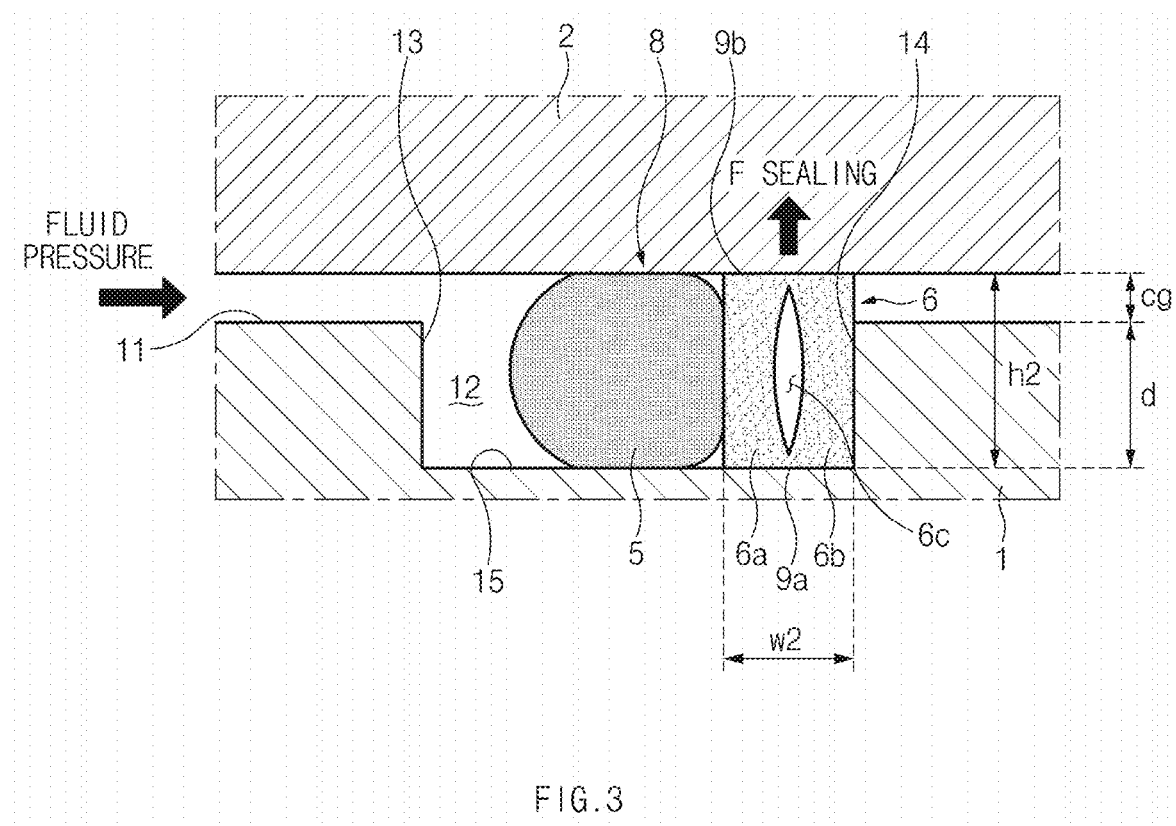
FIG. 3 illustrates an enlarged view of portion A of FIG. 1, a state of the sealing structure in which a back-up ring is expanded under a high fluid pressure condition.

The back-up ring 6 may be an annular ring at least partially received in the groove 12 of the first connector body 1. The back-up ring 6 may be relatively close to the second side 14 of the groove 12. Referring to FIGS. 1-3, the back-up ring 6 may be interposed between the O-ring 5 and the second side 14 within the groove 12 of the first connector body 1 and the back-up ring 6 may hold the O-ring 5. For example, the back-up ring 6 may be made of an elastic material which is easily deformable, such as engineering plastic or rubber.

The outer diameter of the back-up ring 6 may be variable or deformable in the radial direction of the back-up ring 6 depending on the magnitude of the force or fluid pressure acting on the back-up ring 6. Specifically, when the fluid pressure applied between the outer circumference 11 of the first connector body 1 and the inner circumference 21 of the second connector body 2 acts on the O-ring 5 and the back-up ring 6, the back-up ring 6 may expand or contract in a width direction of the back-up ring 6 while contracting or expanding in the radial direction of the back-up ring 6 depending on the magnitude of the fluid pressure.

The back-up ring 6 may include an inner circumferential surface 9a facing the center of the back-up ring 6 and an outer circumferential surface 9b located away from the center of the back-up ring 6. The inner circumferential surface 9a may contact the base surface 15 in the groove 12 of the first connector body 1 and the outer circumferential surface 9b may face the second connector body 2. When the back-up ring 6 contracts or expands in the radial direction of the back-up ring 6 depending on the magnitude of the fluid pressure, the inner circumferential surface 9a of the back-up ring 6 may be supported to the base surface 15 of the groove 12. Accordingly, the position of the inner circumferential surface 9a of the back-up ring 6 may not change and the position of the outer circumferential surface 9b of the back-up ring 6 may be varied. Specifically, the outer circumferential surface 9b of the back-up ring 6 may be spaced apart from the inner circumference 21 of the second connector body 2 (see FIG. 2) or be brought into contact with the inner circumference 21 of the second connector body 2 (see FIG. 3).

Referring to FIG. 2, when the fluid pressure is a relatively low pressure which is lower than a reference pressure, the back-up ring 6 may have a reference shape. The reference shape refers to a shape of the back-up ring 6 expanding in the width direction and contracting radially inward. Here, the reference pressure may be a minimum pressure allowing the back-up ring 6 to expand radially outward. For example, the reference pressure may be 100 bar to 700 bar. Since the inner circumferential surface 9a of the back-up ring 6 is supported to the base surface 15 of the groove 12, the position of the inner circumferential surface 9a of the back-up ring 6 may not change and the outer circumferential surface 9b of the back-up ring 6 may be spaced apart from the inner circumference 21 of the second connector body 2. As the back-up ring 6 contracts radially inward, the outer diameter of the back-up ring 6 may be reduced to the minimum. Accordingly, the thickness of the back-up ring 6 may be a minimum thickness h1, and the width of the back-up ring 6 may be expanded to a maximum width w1. Here, as the width of the back-up ring 6 is expanded to the maximum width w1, the back-up ring 6 may push the O-ring 5 toward the first side 13. Accordingly, a contact area between an outer circumferential surface of the O-ring 5 and the inner circumference 21 of the second connector body 2 may increase. Thus, sealing performance achieved by the O-ring 5 may be maximized even in a condition in which the fluid pressure is low. The width, thickness, and the like of the O-ring 5 may be appropriately selected to adjust a compression rate/a groove filling rate depending on the degree of shape variation (or deformation) of the back-up ring 6.

Referring to FIG. 3, when the fluid pressure is a relatively high pressure, which is higher than the reference pressure, the back-up ring 6 may have an expanded shape. The expanded shape refers to a shape of the back-up ring 6 contracting in the width direction and expanding radially outward. Since the inner circumferential surface 9a of the back-up ring 6 is supported to the base surface 15 of the groove 12, the position of the inner circumferential surface 9a of the back-up ring 6 may not change and the outer circumferential surface 9b of the back-up ring 6 may tightly contact the inner circumference 21 of the second connector body 2. As the back-up ring 6 expands, the outer diameter of the back-up ring 6 may be increased to the maximum. Accordingly, the thickness of the back-up ring 6 (a distance between the inner circumferential surface 9a and the outer circumferential surface 9b) may be a maximum thickness h2, and the width of the back-up ring 6 may be contracted to a minimum width w2. The maximum thickness h2 of the back-up ring 6 may be set to be greater than the sum of the depth d of the groove 12 and the clearance gap cg (h2>d+cg). As the outer circumferential surface 9b of the back-up ring 6 tightly contacts the inner circumference 21 of the second connector body 2, the back-up ring 6 may completely block the clearance gap cg between the first connector body 1 and the second connector body 2.

Figure 4:
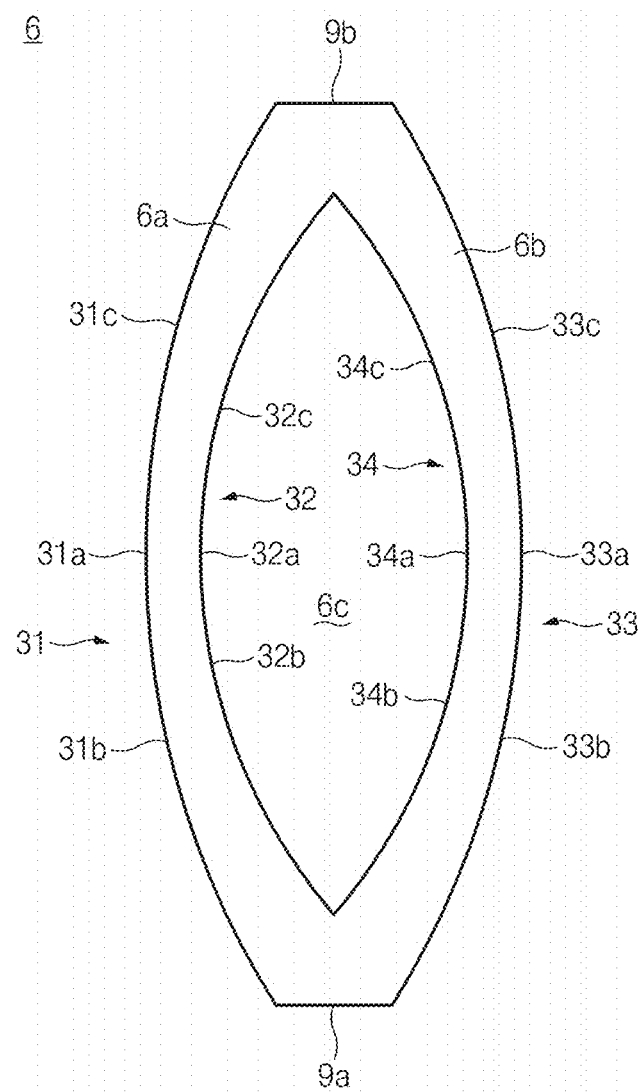
FIG. 4 illustrates a cross-sectional view of a variable back-up ring according to an embodiment of the present disclosure.

Referring to FIG. 4, the back-up ring 6 may include a first half shell 6a extending in an annular shape, a second half shell 6b symmetrically connected to the first half shell 6a, and an inner cavity 6c defined by the first half shell 6a and the second half shell 6b.

The first half shell 6a may face the first side 13 and the second half shell 6b may face the second side 14. In other words, the first half shell 6a and the second half shell 6b may oppose each other. The first half shell 6a may contact the O-ring and the second half shell 6b may contact the second side 14 of the groove 12. As the inner cavity 6c is defined by the first half shell 6a and the second half shell 6b, the inner cavity 6c may be a closed cavity.

When the force or fluid pressure acting on the first half shell 6a and the second half shell 6b is lower than the reference pressure, the first half shell 6a and the second half shell 6b may have a reference shape (see FIG. 2). When the first half shell 6a and the second half shell 6b maintain the reference shape, the first half shell 6a and the second half shell 6b may be convex in an opposite direction toward the outside of the inner cavity 6c. The first half shell 6a and the second half shell 6b may have a predetermined radius of curvature. The radius of curvature of the first half shell 6a may be the same as or be different from the radius of curvature of the second half shell 6b. In other words, when the force or fluid pressure acting on the first half shell 6a and the second half shell 6b is lower than the reference pressure, the first half shell 6a and the second half shell 6b may expand in the width direction of the back-up ring 6. Thus, the first half shell 6a and the second half shell 6b may contract inward in the radial direction of the back-up ring 6. In short, the reference shape may be a shape in which the first half shell 6a and the second half shell 6b expand in the width direction of the back-up ring 6 while contracting inward in the radial direction of the back-up ring 6.

When the force or fluid pressure acting on the first half shell 6a and the second half shell 6b is higher than the reference pressure, the first half shell 6a and the second half shell 6b may have an expanded shape (see FIG. 3). When the first half shell 6a and the second half shell 6b maintain the expanded shape, the first half shell 6a and the second half shell 6b may be relatively flattened. Accordingly, the first half shell 6a and the second half shell 6b may contract in the width direction of the back-up ring 6. Thus, the first half shell 6a and the second half shell 6b may expand outward in the radial direction of the back-up ring 6. In short, the expanded shape may be a shape in which the first half shell 6a and the second half shell 6b contract in the width direction of the back-up ring 6 while expanding outward in the radial direction of the back-up ring 6.

As described above, the shape of the first half shell 6a and the second half shell 6b may vary between the reference shape and the expanded shape as the magnitude of the force or fluid pressure varies.

Referring to FIG. 2, when no fluid pressure or low fluid pressure acts on the back-up ring 6, the first half shell 6a and the second half shell 6b may maintain the reference shape and the inner cavity 6c may have a maximum volume. Referring to FIG. 3, when high fluid pressure acts on the back-up ring 6, the first half shell 6a and the second half shell 6b may expand outward in the radial direction of the back-up ring 6 and the inner cavity 6c may have a minimum volume.

The first half shell 6a may include a first outer surface 31 facing the outside of the back-up ring 6 and a first inner surface 32 facing the inner cavity 6c. The first outer surface 31 may partially contact the O-ring 5 and the first inner surface 32 may define at least a portion of the inner cavity 6c.

In an initial state in which no fluid pressure or low fluid pressure acts on the back-up ring 6, the first half shell 6a may have the reference shape, which is convex toward the outside of the inner cavity 6c. Referring to FIG. 4, in the reference shape of the first half shell 6a, the first outer surface 31 may include an apex 31a, a curved surface 31b extending from the apex 31a toward the inner circumferential surface 9a of the back-up ring 6, and a curved surface 31c extending from the apex 31a toward the outer circumferential surface 9b of the back-up ring 6. The first inner surface 32 may include an apex 32a, a curved surface 32b extending from the apex 32a toward the inner circumferential surface 9a of the back-up ring 6, and a curved surface 32c extending from the apex 32a toward the outer circumferential surface 9b of the back-up ring 6.

The second half shell 6b may include a second outer surface 33 facing the outside of the back-up ring 6 and a second inner surface 34 facing the inner cavity 6c. The second outer surface 33 may partially contact the second side 14 of the groove 12 and the second inner surface 34 may define at least a portion of the inner cavity 6c.

In the initial state in which no fluid pressure or low fluid pressure acts on the back-up ring 6, the second half shell 6b may have the reference shape, which is convex toward the outside of the back-up ring 6. Referring to FIG. 4, in the reference shape of the second half shell 6b, the second outer surface 33 may include an apex 33a, a curved surface 33b extending from the apex 33a toward the inner circumferential surface 9a of the back-up ring 6, and a curved surface 33c extending from the apex 33a toward the outer circumferential surface 9b of the back-up ring 6. The second inner surface 34 may include an apex 34a, a curved surface 34b extending from the apex 34a toward the inner circumferential surface 9a of the back-up ring 6, and a curved surface 34c extending from the apex 34a toward the outer circumferential surface 9b of the back-up ring 6.

Figure 5:
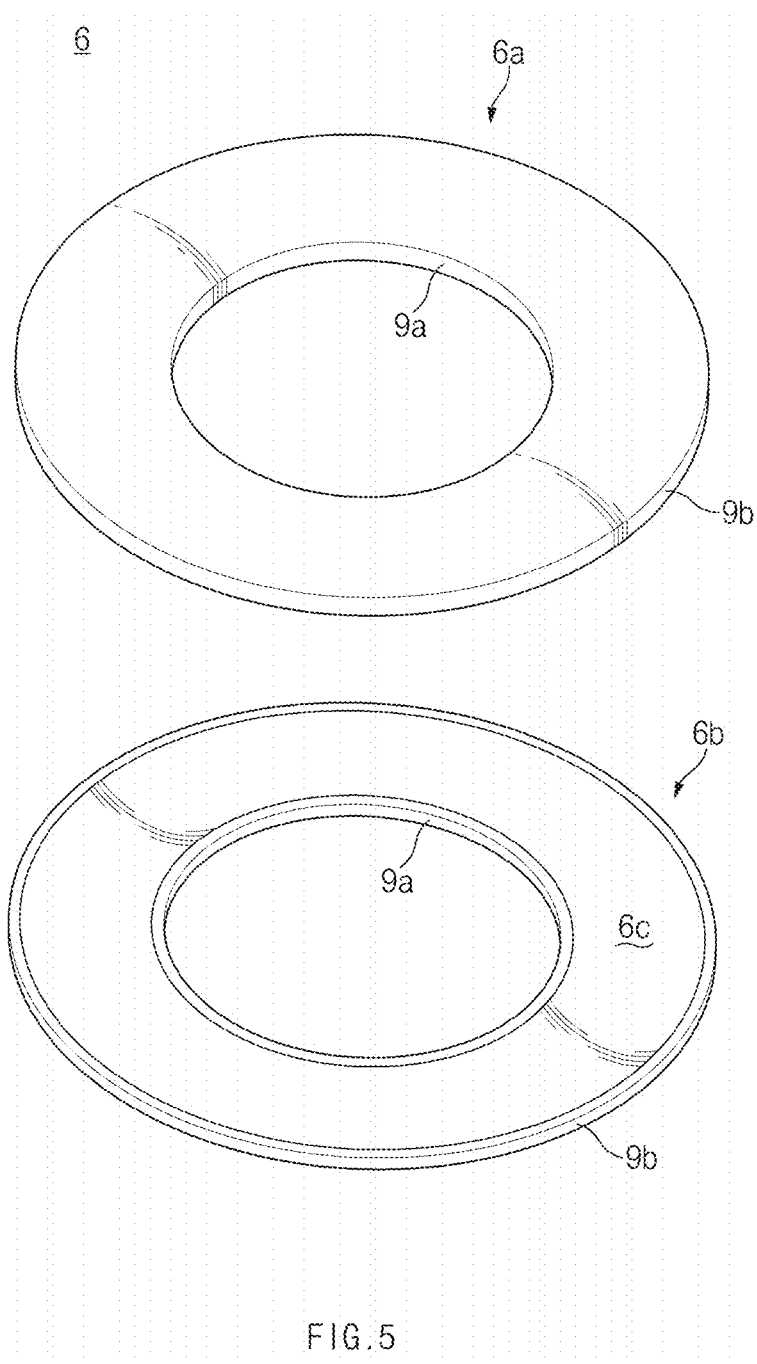
FIG. 5 illustrates an exploded perspective view of a variable back-up ring according to an embodiment of the present disclosure.

Referring to FIGS. 4 and 5, an inner circumferential edge of the first half shell 6a and an inner circumferential edge of the second half shell 6b may be joined through an adhesive and/or the like. An outer circumferential edge of the first half shell 6a and an outer circumferential edge of the second half shell 6b may be joined through an adhesive and/or the like.

Figure 6:
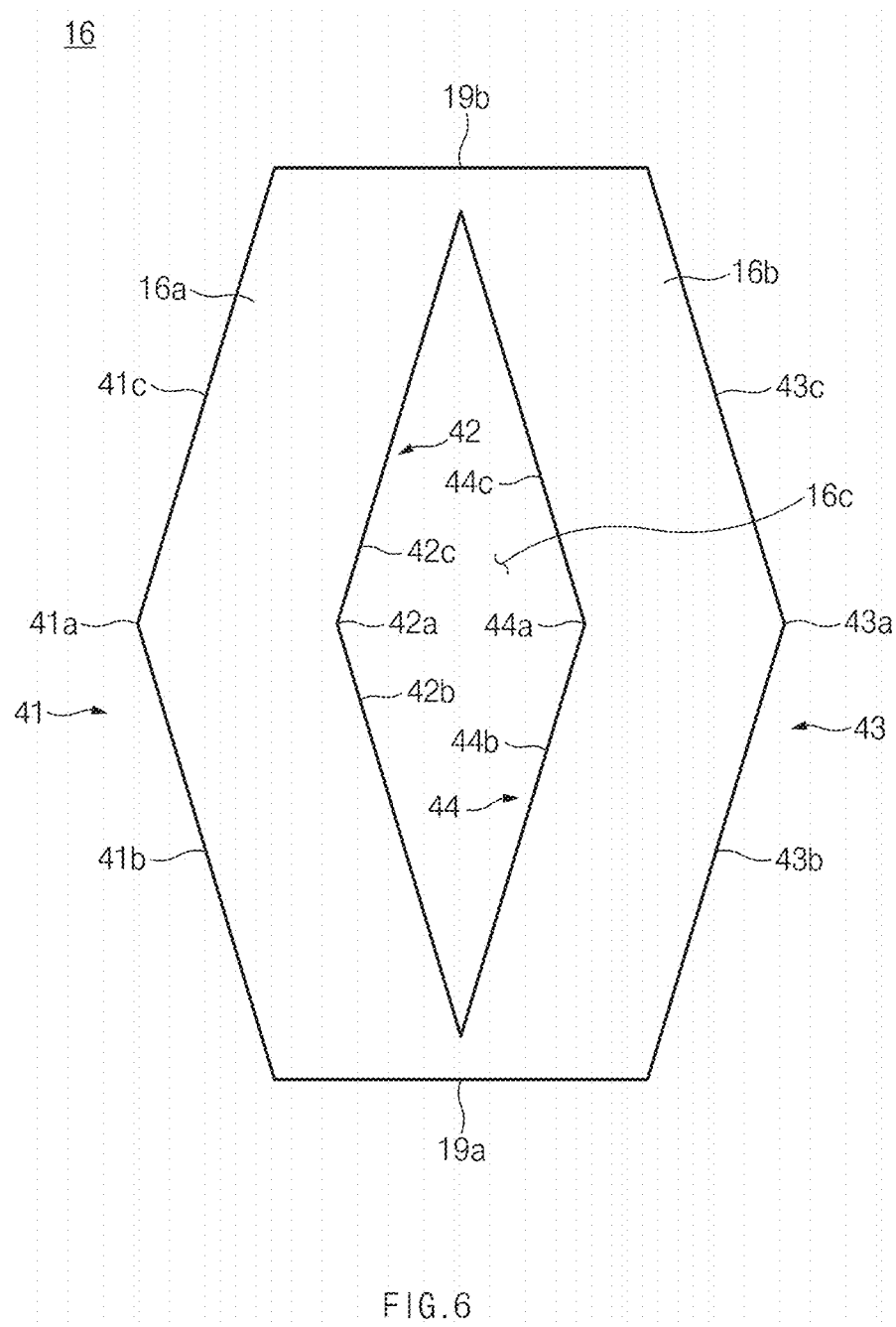
FIG. 6 illustrates a cross-sectional view of a variable back-up ring according to another embodiment of the present disclosure.
Figure 7:
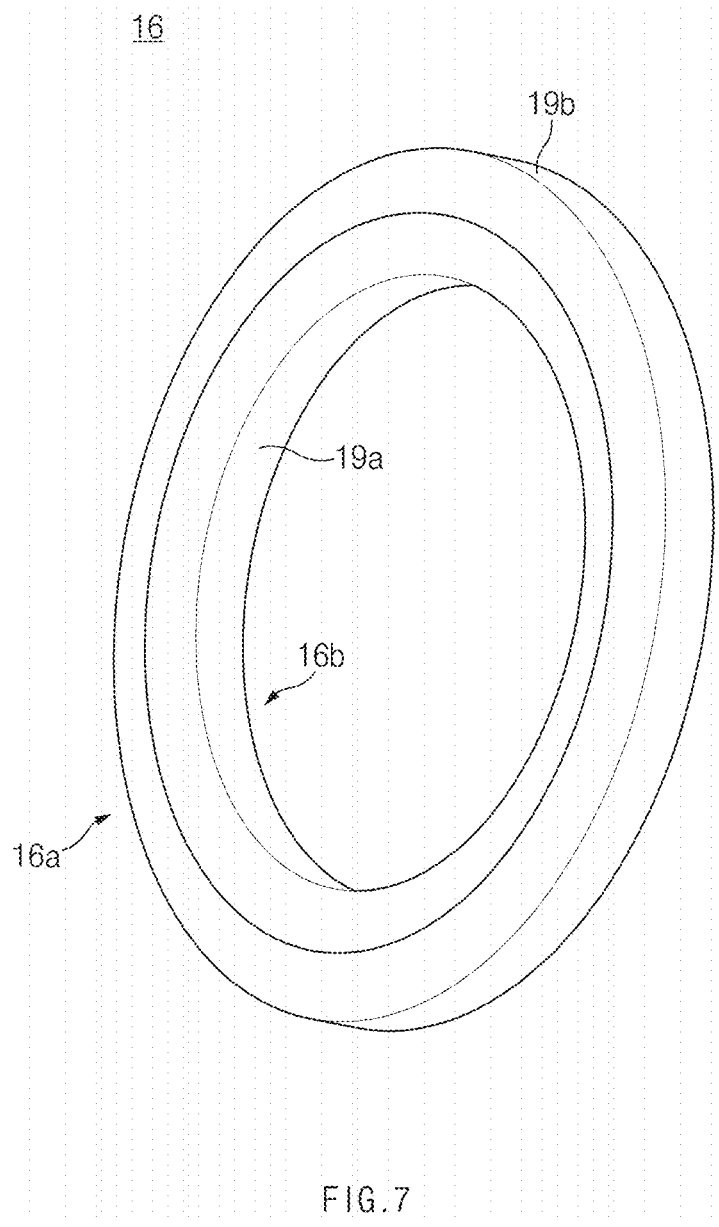
FIG. 7 illustrates a perspective view of the variable back-up ring illustrated in FIG. 6.

FIG. 6 illustrates a back-up ring according to another embodiment of the present disclosure. Referring to FIG. 6, a back-up ring 16 may include an inner circumferential surface 19a facing the center of the back-up ring 16 and an outer circumferential surface 19b located away from the center of the back-up ring 16. The inner circumferential surface 19a may contact the base surface of the groove 12 of the first connector body 1 and the outer circumferential surface 19b may face the second connector body 2. When the back-up ring 16 contracts or expands in the radial direction depending on the magnitude of a fluid pressure, the inner circumferential surface 19a of the back-up ring 16 may be supported to the base surface 15 of the groove 12. Accordingly, the position of the inner circumferential surface 19a of the back-up ring 16 may not change and the position of the outer circumferential surface 19b of the back-up ring 16 may be varied.

The back-up ring 16 may include a first half shell 16a facing the first side 13, a second half shell 16b facing the second side 14, and an inner cavity 16c defined by the first half shell 16a and the second half shell 16b.

The first half shell 16a may contact the O-ring 5 and the second half shell 16b may contact the second side 14 of the groove 12. As the inner cavity 16c is defined by the first half shell 16a and the second half shell 16b, the inner cavity 16c may be a closed cavity.

The first half shell 16a may include a first outer surface 41 facing the outside of the back-up ring 16 and a first inner surface 42 facing the inner cavity 16c. The first outer surface 41 may partially contact the O-ring 5 and the first inner surface 42 may define at least a portion of the inner cavity 16c.

In an initial state in which no fluid pressure or low fluid pressure acts on the back-up ring 16, the first half shell 16a may have a reference shape, which is convex toward the outside of the back-up ring 16. Referring to FIG. 6, in the reference shape of the first half shell 16a, the first outer surface 41 may include an apex 41a, an inclined surface 41b extending obliquely from the apex 41a toward the inner circumferential surface 19a of the back-up ring 16, and an inclined surface 41c extending obliquely from the apex 41a toward the outer circumferential surface 19b of the back-up ring 16. The first inner surface 42 may include an apex 42a, an inclined surface 42b extending obliquely from the apex 42a toward the inner circumferential surface 19a of the back-up ring 16, and an inclined surface 42c extending obliquely from the apex 42a toward the outer circumferential surface 19b of the back-up ring 16.

The second half shell 16b may include a second outer surface 43 facing the outside of the back-up ring 16 and a second inner surface 44 facing the inner cavity 16c. The second outer surface 43 may partially contact the second side 14 of the groove 12 and the second inner surface 44 may define at least a portion of the inner cavity 16c.

In the initial state in which no fluid pressure or low fluid pressure acts on the back-up ring 16, the second half shell 16b may have a reference shape, which is convex toward the outside of the back-up ring 16. Referring to FIG. 6, in the reference shape of the second half shell 16b, the second outer surface 43 may include an apex 43a, an inclined surface 43b extending obliquely from the apex 43a toward the inner circumferential surface 19a of the back-up ring 16, and an inclined surface 43c extending obliquely from the apex 43a toward the outer circumferential surface 19b of the back-up ring 16. The second inner surface 44 may include an apex 44a, an inclined surface 44b extending obliquely from the apex 44a toward the inner circumferential surface 19a of the back-up ring 16, and an inclined surface 44c extending obliquely from the apex 44a toward the outer circumferential surface 19b of the back-up ring 16.

As described above, as the first half shell 6a or 16a and the second half shell 6b or 16b are convex in the opposite direction, the shape of the back-up ring 6 or 16 may be easily variable in the radial direction.

As set forth above, according to embodiments of the present disclosure, the shape of the back-up ring may be variable or deformable in the radial direction depending on the magnitude of the fluid pressure acting on the back-up ring and/or the O-ring. The variable back-up ring may expand radially outward in the condition in which the fluid pressure is higher than the reference pressure, thereby completely blocking or minimizing the clearance gap between the first connector body and the second connector body. Thus, the sealing performance between the first connector body and the second connector body may be maximized.

Hereinabove, although the present disclosure has been described with reference to several embodiments and the accompanying drawings, the present disclosure is not limited thereto. The present disclosure and the embodiments may be variously modified and altered by those having ordinary skill in the art to which the present disclosure pertains without departing from the spirit and scope of the present disclosure claimed in the following claims.

What is claimed is:

1. A sealing structure comprising:
a first connector body having a groove;
a second connector body encompassing the first connector body;
an O-ring partially received in the groove of the first connector body; and
a variable back-up ring partially received in the groove of the first connector body and holding the O-ring,
wherein the variable back-up ring is deformable in a radial direction depending on a magnitude of a fluid pressure applied between the first connector body and the second connector body,
wherein the back-up ring includes a first half shell extending in an annular shape, a second half shell symmetrically connected to the first half shell, and an inner cavity defined by the first half shell and the second half shell, and
wherein the inner cavity is a closed cavity.

2. The sealing structure according to claim 1, wherein:
the variable back-up ring includes an inner circumferential surface contacting the groove of the first connector body and an outer circumferential surface facing an inner circumference of the second connector body; and
a position of the outer circumferential surface of the variable back-up ring is variable in a radial direction of the variable back-up ring depending on the magnitude of the fluid pressure.

3. The sealing structure according to claim 2, wherein a shape of the variable back-up ring is variable so that the outer circumferential surface of the variable back-up ring is brought into contact with the inner circumference of the second connector body when the magnitude of the fluid pressure is higher than a reference pressure.

4. The sealing structure according to claim 1, wherein:
the groove of the first connector body includes a base surface recessed radially inward from an outer circumference of the first connector body, a first side relatively close to a source of the fluid pressure, and a second side opposing the first side;
the O-ring is relatively close to the first side; and
the variable back-up ring is relatively close to the second side.

* * * * *